United States Patent Office 2,945,845
Patented July 19, 1960

2,945,845

POLYMERIZATION OF OLEFINS WITH COMPLEX CATALYST COMPRISING PLATINUM OR PALLADIUM

Louis Schmerling, Riverside, Ill., assignor, by mesne assignments, to Universal Oil Products Company, Des Plaines, Ill., a corporation of Delaware No Drawing. Filed Apr. 28, 1958, Ser. No. 731,139

8 Claims. (Cl. 260—93.7)

This invention relates to a process for polymerizing olefin monomers to form plastic-like products having melting points substantially greater than the boiling point of water, characterized by structural rigidity, but of sufficient resiliency to resist breakage upon impact with solid objects. More specifically, the present invention concerns a polymerization process of the foregoing type utilizing low molecular weight olefinic hydrocarbons as the charge stock and employing a catalyst of specific composition which results in the formation of products of the aforementioned variety, distinguished from other polymerization processes of the art which yield products of less desirable physical properties.

It is now widely recognized that olefinic hydrocarbons, particularly ethylene, may be polymerized in the presence of certain specific catalyst compositions to form the so-called "hard" polymers having melting points generally at or only slightly above the boiling point of water. One of these catalysts, distinguished from many other polymerization catalysts in the fact that solid, rather than liquid or greaselike polymers are formed, consists of a mixture of titanium tetrachloride and aluminum metal which when contacted with ethylene at a relatively elevated temperature and pressure forms the solid polymer as one of the principal products of the process.

The catalyst of the present process, a supported noble metal of group VIII of the periodic table composited with titanium tetrachloride and aluminum, yields a polymer of substantially higher melting point than is obtained in the absence of the noble metal component. Such higher melting point polymers are obviously highly desirable in many applications of the polymers, particularly for uses in which superheated steam or other high temperature fluids are involved.

The variable in the present process which accounts for the production of polymers having the present, unusually high, melting points is the composition of the catalyst utilized to effect the polymerization reaction, consisting of a noble metal of group VIII of the periodic table supported on an inert base composited with a mixture of a titanium tetrahalide and aluminum. As will hereinafter be shown, it is only a combination of the foregoing catalytic components which will effect the polymerization of mono-olefinic hydrocarbons to form the very high melting products of this invention. Thus, substitution of any one of the foregoing catalytic ingredients in the process by another substance will result in either no substantial degree of polymerization, a product of substantially lower melting point or a substantially reduced yield of polymer which is also of lower melting point.

In one of its embodiments this invention relates to a process for polymerizing an olefinic hydrocarbon containing up to about 12 carbon atoms which comprises contacting said olefinic hydrocarbon at a temperature of from about 25° to about 300° C. and at a superatmospheric pressure with a catalyst consisting of a mixture of an aluminum-containing metal, a titanium tetrahalide and a metal selected from the noble metals of group VIII of the periodic table supported on an inert base.

More specific embodiments of this invention relate to polymerization processes employing ethylene as the preferred olefinic charge stock, utilizing platinum as the group VIII metal component of the catalyst composition and titanium tetrachloride as the preferred halide, the polymerization preferably being effected at temperatures within the range of from about 80° to about 250° C. and at pressures of at least 10 atmospheres.

The polymeric products of this invention, particularly the polymers of ethylene, have molecular weights substantially above about 10,000 and many above about 100,000. Since the melting point of the polymer is directly proportional to its molecular weight, in the absence of other factors which tend to affect the melting point, it is believed that the molecular weights of the products of this invention are exceedingly high, the product including components having molecular weights which may lie in the range of from about 500,000 to 3,000,000, or more, the average molecular weight of the polymers in the product being in any event higher than the molecular weights of olefin polymers heretofore obtained and generally have melting points above about 150° C. The high melting points may also indicate a modification of the carbon skeleton of the polymer. Although the hydrocarbon molecules formed by the polymerization reaction, particularly in the case of ethylene polymers, contain a single olefinic double bond per molecule, the polymer molecule may nevertheless be considered essentially paraffinic in structure, since the single olefinic double bond in the large hydrocarbon molecule has substantially no effect on the chemical and physical properties of the resultant polymer and particularly little effect on the sensitivity of the polymer to chemical attack. The substantially paraffinic character of the product of this invention is considered to be a decided advantage in the many uses to which the product may be put, since the substantial absence of unsaturated double bonds in the molecular structure of the product is a factor which accounts for its inertness to oxidation and the absence of any tendency for the product to introduce rancidity into food placed in containers fabricated from the polymers. The essential paraffinicity of the polymer also accounts for its marked insolubility in common solvents, such as water and many oxygenated organic compounds, such as alcohols, ketones, esters, etc., making the product particularly suitable for the fabrication of liners therefrom for containers manufactured from a corrodable metal or for containing products in which solvents are incorporated such as foods, plastics, etc. In general, the inertness of the polymeric product of this invention to solvents, atmospheric components and conditions is a decided advantage in the applicability and uses of the present product.

The essential component of the charge stock to the present process is an olefinic hydrocarbon monomer containing up to about 12, and more preferably, from 2 to about 5 carbon atoms. Ethylene is the preferred olefin. The olefin may be charged to the process individually (that is, in the form of the substantially pure olefin monomer) or in admixture with other olefinic or paraffinic hydrocarbons with which the olefin may be mixed as recovered from its source. Mono-olefins of low molecular weight, particularly ethylene, are the preferred olefinic charge stocks herein because of the more desirable physical properties of the resulting polymeric products produced therefrom (greater molecular weight, hardness, toughness, etc.). Furthermore, 1-alkenes such as 1-butene and 1-pentene are preferred over isomers in which the olefinic bond occurs on a more centrally located carbon atom, such as 2-butene and 2-pentene. The preferred olefinic feed stocks are made up entirely of mono-olefin monomers and more preferably contain only mono-olefins of the same type and of the same molecular weight, although light gas mixtures (for example, a mixture of $C_2$—$C_4$ olefins separated from the light gaseous product of a thermal cracking process) constitutes a readily available, highly effective charge stock to the present process. Other utilizable feed stocks in the present process are the cyclo-olefins, such as cyclopentene and cyclohexene which may be charged as the individual monomers or in admixture with low molecular weight aliphatic olefins, such as ethylene or propylene. The olefin monomer may also be a cyclic hydrocarbon-substituted alkene, such as 2-cyclohexylbutene-1, styrene, α-methylstyrene, divinylbenzene, 3-phenyl-pentene-1, norbornylene, etc.

The present catalyst which is the process variable responsible for the production of the present high molecules weight, high melting polymers is a mixture of ingredients consisting of a metal comprising aluminum, a titanium tetrahalide and a noble metal selected from the elements of group VIII of the periodic table composited with an inert support such as alumina, the foregoing individual components of the catalyst co-acting in combination within the reaction zone to result in polymerization of the mono-olefin feed stock in such manner that each olefin monomer which condenses with a previously formed polymer adds to the polymer at the end of the chain, resulting in the production of a long, straight-chain hydrocarbon molecule having an olefinic double bond at the end of the polymer chain. The mechanism of the polymerization reaction and manner in which such end-to-end polymerization occurs is not definitely established; however, it is believed to occur by way of an oxidation-reduction mechanism between the aluminum-containing metal and titanium tetrahalide, a reaction enhanced in by the group VIII element which may activate the centers of polymerization at a lower temperature and pressure to effect the condensation of additional olefin monomers at the ends of the polymer chains at conditions of lesser severity than is otherwise observed when the group VIII component is absent from the catalyst composition.

Of the titanium tetrahalides utilizable in the present process, selected from the fluorides, chlorides and bromides, as well as mixtures thereof, titanium tetrachloride is the most readily available, the least costly and generally the preferred tetrahalide in the present polymerization process. Although any of the foregoing titanium tetrahalides, including the mixed halides, such as titanium difluoro dichloride, may be utilized, the various halides are not necessarily considered to be equivalent in their effectiveness or preference as catalyst components in the present polymerization process.

The aluminum component of the present catalyst mixture is preferably supplied in relatively pure form and in finely divided condition, such as powdered aluminum, commonly employed as a pigment for aluminum paint. It is believed that powdered aluminum offers an advantage because of the greater surface area of aluminum available to the other catalyst ingredients and the olefin monomer reactant provided by such finely divided particles; however, metallic aluminum in the form of larger particles, such as aluminum granules, aluminum chips and especially aluminum foil may also be used. It is further believed that the increased surface area of the powdered aluminum ingredient provides a greater number of active centers at which polymerization is initiated, the powdered form of the aluminum reducing the activation energy required to initiate the polymerization reaction. Although metallic aluminum in its substantially pure form is the particularly preferred form for use in the present process, aluminum-containing alloys in which aluminum constitutes a predominant proportion, such as Raney nickel alloy, magnesium-aluminum alloys, iron-aluminum alloys, copper-aluminum alloys, etc. may also be employed in the present polymerization process, although not necessarily with the same results observed for aluminum in its substantially pure form.

The promoting component of the present catalyst composition is preferably supplied in the form of a composite of inert support with a group VIII noble metal, in a form prepared by depositing the group VIII noble metal on the inert support, such as alumina, or an alumina-containing composite prior to the use of the composite in the present process. The composite of the group VIII noble metal and inert support may also, and in some instances preferably, contain a small amount (up to about 10 percent and more preferably up to about 3 percent by weight) of combined halogen, selected from fluorine, chlorine and bromine. Suitable inert supports for the group VIII noble metal may be selected from materials which in themselves contribute no discernable catalytic effect except that of dispersing and making available to the reaction the group VIII noble metal, including such solid materials as charcoal, silica gel, and others, particularly alumina in any of its various physical modifications. An aluminum oxide-containing support for the group VIII noble metal may be supplied from any of a variety of natural sources, such as the mineral bauxite or in admixture with minor amounts of other oxides, such as silica, molybdenum oxide, chromia, etc., but is preferably supplied in relatively pure form, such as finely powdered or pelleted aluminum oxide precipitated from an aluminum salt by the addition of an alkali, ammonium hydroxide or hexamethylene tetramine solutions to an aqueous solution of a water-soluble aluminum salt. The thus precipitated aluminum oxide may be pelleted into discrete particles of larger mass and calcined to produce a structurally stable aluminum oxide pellet or the oxide may be precipitated in the form of specially-shaped gel particles from an alumina sol suspension. In a preferred form of the catalyst, alumina containing a finite quantity of combined halogen is composited with the group VIII noble metal and thereafter pelleted or otherwise formed into a particle of larger mass and the resultant composite utilized in the polymerization reaction zone. For this purpose, for example, the noble metal may be composited with alumina powder in the form of its sulfide salt and the composite heated to a temperature which will decompose the sulfide to the metallic group VIII element. If combined halogen is desired in the composite, the calcined composite may be mixed with a sufficient quantity of hydrogen chloride or hydrogen fluoride to form the desired composite. Active composites of these components contain from 0.1 to about 10%, and more preferably, from about 0.5 to about 3.0% by weight of halogen, from 0.01 to about 2% by weight of group VIII noble metal, the remainder being alumina. The catalyst known in the art as "Platforming" catalyst is suitable for the present process. The group VIII noble metal thereof may be derived from any of the known, water-soluble salts including the halide, nitrate, sulfate, etc., of ruthenium, rhodium, palladium, platinum, osmium and iridium, or mixtures thereof, although platinum and palladium (in the order named) are the preferred group VIII noble metal components of the composite. All of the foregoing elements of group VIII of the periodic table are not necessarily of equivalent effectiveness, platinum being preferred, not only because of its greater abundance and lower cost, but because of its high level of activity as catalyst promoter in the present process.

The foregoing catalyst components which in combination are responsible for the production of the present high molecular weight "hard" polymers are supplied to the reaction zone in approximately the following proportions: from about 1% to about 80% by weight of the mixture of catalyst ingredients of titanium tetrahalide, from about 5% to about 90% of the mixture of the aluminum-containing metal, and from about 5% to about 40% by weight of the combined ingredients of the composite of group VIII noble metal on the inert support, such as alumina. Particularly preferred mixtures of catalyst ingredients are those mixtures containing approximately equal quantities of aluminum metal, titanium tetrahalide, and the composite of the group VIII noble metal on alumina, plus or minus 10% of any one of this group.

The polymerization of the olefinic charge stock is desirably effected in the presence of an inert diluent selected from certain types of organic compounds which boil at sufficiently elevated temperatures to remain in essentially liquid phase at the temperature and pressure utilized in the process. The diluent is preferably an organic compound which is inert to the catalyst and olefinic monomer and which accordingly can be recovered from the reaction product in an unchanged condition. Inert materials of this character include the saturated hydrocarbons, such as the paraffinic and naphthenic hydrocarbons, particularly the normal paraffins of from $C_5$ to about $C_{10}$ carbon atom content, such as n-pentane, n-hexane, cyclohexane, n-heptane and n-octane. Another preferred class of organic compounds utilizable as diluents in the present process are the halogen-substituted aliphatic and aromatic hydrocarbons, such as dichloropropane, perfluorohexane, chlorobenzene, p-chlorotoluene, a dichlorobenzene, such as 1,4-dichlorobenzene, benzenehexachloride, etc., as well as numerous others selected from the above classes of compounds. Aromatic hydrocarbons may also be utilized, but under some conditions of reaction, these hydrocarbons may undergo alkylation to form mono- and poly-alkyl-substituted aromatic derivatives.

The polymerization process may be effected in a batch-type operation by contacting the olefinic charge stock, either as a substantially pure olefin or in admixture with one or more paraffins, in a reaction vessel which may be maintained at a relatively high pressure, such as a pressure autoclave. In such a typical batch-type operation the catalyst, the diluent, if utilized, and olefinic monomer are charged into the autoclave to the desired pressure and the autoclave thereafter heated to a temperature at which reaction occurs, as hereinafter indicated, as the mixture of catalyst and olefins is agitated, for example by stirring. The polymeric product is subsequently recovered from the autoclave when the rate of polymerization drops to an uneconomical level. Before withdrawing the reaction mixture, one or more additional charges of olefin monomer may be introduced into the reactor. The polymerization is effected at a superatmospheric pressure, preferably of at least 10 atmospheres, particularly when utilizing a normally gaseous olefin such as ethylene and/or propylene, although no substantial advantage is realized by operating the process at pressures in excess of about 3,000 p.s.i. Suitable reaction temperatures are within the range of from about room temperature, or about 25° C., to temperatures as high as about 300° C., preferably within the range of from about about 80° to about 250° C.

It is usually desirable to carry out the polymerization in the substantial absence of air or other reactive gas which may interfere with the polymerization reaction by changing the composition of the catalyst or the product as a result of secondary reactions. Hydrogen is also desirably excluded from the reaction zone, since in the presence of the present noble metal component of the catalyst composition and at the operating conditions herein provided, the olefinic monomer or intermediate polymer may undergo hydrogenation to thereby completely inactivate the olefinic monomer charge stock.

The present process, although particularly adapted to batch-type methods of operation, may also be effected on essentially a continuous basis by distributing a mixture of the solid components of the catalyst (that is, a mixture of aluminum and the Group VIII noble metal supported on the aluminum oxide component) in powdered or granule form or in layers in an elongated reactor through which a mixture of titanium tetrahalide and the olefinic charge stock are passed at the temperature and pressure required for effecting the desired polymerization. Thus, the solid components of the catalyst composition may be composited into granular particles, such as the aforementioned pelleted form, and packed in a tubular reaction vessel through which the olefinic reactant and titanium tetrahalide, preferably dissolved in the diluent, are thereafter passed, the feed mixture being charged in liquid or gaseous phase into one end of the tubular reactor and the product, diluent and unreacted charge stock are withdrawn from the other end. By such means a truly continuous process may be provided, since the desired polymer product may be continuously separated from the effluent stream of the reactor, the solid portion of the product extracted with a suitable solvent to remove the low molecular weight liquid or wax-like polymers and the residue separated into solid fractions for fractional elution from the non-extracted portion of the polymer product.

It is generally found that the highest molecular weight components of the polymer product are relatively insoluble in most organic solvent, such as aromatic hydrocarbons, while the lower molecular weight components of the product are relatively more soluble in such solvents. Thus, the gross product of the polymerization reaction may be separated into several fractions comprising products of different ranges of molecular weights by fractional elution of the various polymers from the mixture, utilizing various solvents in succession by contact with the gross product. In a typical step-wise fractionation the low molecular weight, wax-like and grease-like polymers may be dissolved from the product by contacting and mixing the latter with a liquid paraffin, such as hexane, at the boiling point of the hexane solvent, leaving a residue of the higher molecular weight polymers. A second fraction comprising normally solid polymers of higher molecular weight may thereafter be separated from the hexane treated residue in a Soxhlet-type extractor utilizing an aromatic solvent, such as benzene, toluene or xylene. A fraction of still higher molecular weight may be separated from the residue of the preceding extraction by contacting the residue with a chlorinated hydrocarbon solvent such as p-chlorotoluene at the boiling point of the latter solvent. The residue from the final extraction is generally insoluble in any other solvent and constitutes the portion of the product of the highest molecular weight. Although any or all of the various fractions may be present in the gross product of the present polymerization process, it is generally characteristic of the present catalyst and a noteworthy distinction thereof over catalysts heretofore known, that the product obtained therefrom has a generally much lower proportion of low molecular weight liquid and wax-like polymers than other catalyst-activated systems, the gross product in most cases containing less than 10% by weight of polymers other than the highest molecular weight solvent-insoluble products.

This invention is further illustrated in the following examples which are intended for illustrative purposes only and not for limiting the scope of the invention necessarily in accordance therewith.

*Example 1*

A mixture of 5 grams each of powdered aluminum (Alcoa atomized aluminum pigment) and platforming catalyst (a composite of platinum, alumina and halogen, containing approximately 0.1% by weight of platinum and 1.5% each of chlorine and fluorine, as bound halogen) and 2 grams of titanium tetrachloride was placed in the glass liner of an 850 cc. capacity autoclave. The autoclave was thereafter flushed with nitrogen to remove all traces of air from the inside of the vessel, followed by charging ethylene into the autoclave to an initial pressure of 40 atmospheres. The autoclave was then rotated as it was heated and as the contents of the reaction mixture approached a temperature of 90° C. reaction commenced, indicated by the rise in the temperature of the autoclave to 101° C. Thereafter, rotation of the autoclave was continued for a total reaction period of 3.5 hours. After cooling the autoclave to room temperature, the pressure dropped to 1 atmosphere. The contents of the autoclave were removed and 37 grams of amber-colored poly-ethylene were recovered. The product was washed with hot n-heptane to remove the low molecular weight liquid and wax-like portion of the polymer product. Evaporation of the normal heptane yielded 2 grams of liquid polymer which boiled at temperatures of from 150° to over 350° C. The residue recovered from the heptane extraction weighed 35 grams, the residue being soluble in hot toluene but insoluble in cold toluene. The material had a softening point from 170° to 175° C. When placed in a Clark press at 160° C. and compressed at a pressure of 10,000 p.s.i., the solid polymer yielded a flexible sheet of poly-ethylene plastic which had excellent tear resistance and maintained its original structural form in boiling water.

*Example II*

When the polymerization of ethylene is carried out in the autoclave and at reaction conditions otherwise similar to the experiment of Example I, above, except that the platforming catalyst is replaced by 5 grams of alumina containing 1.5% each of chlorine and fluorine as combined halides, the polymer is a mixture of liquid and solid portions in which the liquid portion constitutes a much larger proportion of the total polymer product and the solid portion melts at a substantially lower temperature. Thus, in the following run, 5 grams of Alcoa finely powdered aluminum pigment, 5 grams of alumina containing 1.5% each of fluorine and chlorine as bound halides and 2 grams of titanium tetrachloride were charged into the glass liner of the 850 cc. capacity autoclave utilized in Example I, flushed with nitrogen and thereafter charged with ethylene to a pressure of 40 atmospheres. The autoclave was again rotated as it was heated and at 90° C. the reaction started to occur, rising to a maximum of 101° C. After a reaction period of 3.5 hours and after cooling the autoclave to room temperature the residual pressure was 5 atmospheres. The product was removed from the autoclave and extracted with n-heptane, yielding 4 grams of liquid polymer and 21 grams of solid polymer which was soluble in hot toluene, but insoluble in cold toluene. A melting point determination of the solid portion of the product indicated that it softens at a temperature of from 130° to 135° C. and when compressed in a Clark press at 10,000 pounds p.s.i. and 160° C. yields a polymer having substantially lower tear resistance than the plastic poly-ethylene sheet obtained in Example I, above.

In another comparative experiment utilizing the apparatus in Example I and at the same reaction conditions of temperature and pressure employed in Example I, except that the catalyst consisted of a mixture of 5 grams of Alcoa aluminum pigment and 2 grams of titanium tetrachloride, no additional catalyst ingredients being utilized, the product consisted of 31 grams of solid polymer and 2 grams of liquid polymer, the solid polymer having a melting point of 120° to 135° C. The solid, when compressed in a Clark press, produced a plastic sheet of substantially lesser tear strength than the product of Example I, above.

*Example III*

The results of Example I were substantially duplicated when the catalyst mixture charged into the autoclave consisted of 5 grams of powdered aluminum pigment, 2 grams of titanium tetrachloride and a composite of 0.10% palladium supported on alumina containing 1.5% chlorine and 1.5% fluorine, as combined halides. The product was a tough, tear resistant plastic having a softening point of from about 170° to about 175° C.

*Example IV*

When propylene is treated in accordance with the procedure of Example I, a solid polymer melting at about 140° C. is obtained.

I claim as my invention:

1. In the catalytic polymerization of an alpha-monoolefinic hydrocarbon of from 2 to about 12 carbon atoms per molecule in the presence of a catalyst consisting essentially of a titanium tetrahalide and aluminum, the improvement which comprises adding to said catalyst a metal selected from the group consisting of platinum and palladium.

2. The improvement of claim 1 further characterized in that said olefinic hydrocarbon is ethylene.

3. The improvement of claim 1 further characterized in that said olefinic hydrocarbon is propylene.

4. In the catalytic polymerization of ethylene in the presence of a catalyst consisting essentially of titanium tetrachloride and aluminum, the improvement which comprises adding platinum to said catalyst.

5. The improvement of claim 4 further characterized in that platinum is supported on said alumina containing combined halogen selected from the group consisting of chlorine and fluorine.

6. The improvement of claim 5 further characterized in that the composite of alumina and platinum contains up to about 3% by weight of combined halogen.

7. In the catalytic polymerization of an alpha-monoolefinic hydrocarbon of from 2 to about 12 carbon atoms per molecule in the presence of a catalyst consisting essentially of a titanium tetrahalide and aluminum, the improvement which comprises adding to said catalyst a metal selected from the group consisting of platinum and palladium supported on alumina.

8. In the catalytic polymerization of ethylene in the presence of a catalyst consisting essentially of titanium tetrachloride and aluminum, the improvement which comprises adding to said catalyst platinum supported on alumina.

References Cited in the file of this patent

UNITED STATES PATENTS

| | | |
|---|---|---|
| 2,777,805 | Lefrancois et al. | Jan. 15, 1957 |
| 2,840,551 | Field et al. | June 24, 1958 |
| 2,846,427 | Findlay | Aug. 5, 1958 |
| 2,854,487 | Quin | Sept. 30, 1958 |
| 2,862,874 | Boedeker et al. | Dec. 2, 1958 |

FOREIGN PATENTS

| | | |
|---|---|---|
| 682,420 | Great Britain | Nov. 12, 1952 |